(12) United States Patent
Wang

(10) Patent No.: US 7,369,809 B1
(45) Date of Patent: May 6, 2008

(54) SYSTEM AND METHOD FOR CONTINUOUS BROADCAST SERVICE FROM NON-GEOSTATIONARY ORBITS

(75) Inventor: Arthur W. Wang, Buena Park, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1275 days.

(21) Appl. No.: 09/702,218

(22) Filed: Oct. 30, 2000

(51) Int. Cl.
H04B 7/185 (2006.01)

(52) U.S. Cl. .................... 455/12.1; 455/427; 455/3.02; 455/430

(58) Field of Classification Search ............... 455/12.1, 455/13.1, 13.2, 436, 437, 427, 430, 429, 455/428, 13.3, 445, 440, 3.01, 3.02
See application file for complete search history.

(56) References Cited

U.S. PATENT DOCUMENTS

| 3,176,301 | A | 3/1965 | Wellons et al. |
|---|---|---|---|
| 3,430,244 | A | 2/1969 | Bartlett et al. |
| 3,497,807 | A | 2/1970 | Newton |
| 3,618,097 | A | 11/1971 | McLeod, Jr. |
| 3,706,999 | A | 12/1972 | Tocquec et al. |
| 3,936,837 | A | 2/1976 | Coleman et al. |
| 4,126,865 | A | 11/1978 | Longhurst et al. |
| 4,236,161 | A | 11/1980 | Ohm |
| 4,263,599 | A | 4/1981 | Bielli et al. |
| 4,343,005 | A | 8/1982 | Han et al. |
| 4,380,014 | A | 4/1983 | Howard |
| 4,602,259 | A | 7/1986 | Shepard |
| 4,660,045 | A | 4/1987 | Clark |
| 4,689,625 | A | 8/1987 | Barmat |
| 4,691,882 | A | 9/1987 | Young |
| 4,803,495 | A | 2/1989 | Monser et al. |
| 4,809,935 | A | 3/1989 | Draim |
| 4,819,002 | A | 4/1989 | Reboullet |
| 4,875,052 | A | 10/1989 | Anderson et al. |

(Continued)

FOREIGN PATENT DOCUMENTS

EP 0792799 9/1997

(Continued)

OTHER PUBLICATIONS (Anonymous); "Orbital Plans High-Capacity 'Space Cable' Global Satellite Network"; Press Release; Sep. 25, 1997; XP002132567.

(Continued)

*Primary Examiner*—Nay Maung
*Assistant Examiner*—John J. Lee

(57) ABSTRACT

A method, apparatus for providing at least near continuous broadcast services to one or more terrestrial receiver stations is disclosed. The system comprises a plurality of satellites, each satellite in an inclined, elliptical geosynchronous orbit, each satellite providing a portion of the at least near continuous broadcast service to the terrestrial receiver. In one embodiment, the system also comprises a receiver station having an legacy antenna modified so as to include a sensitivity pattern substantially matched to the track of the apparent position of the satellites actively broadcasting information to the receiver stations. The present invention is also embodied in a method for receiving at least near continuous broadcast service from at least one of a plurality of satellites at a time, each satellite in an inclined, elliptical, geosynchronous orbit.

11 Claims, 9 Drawing Sheets

U.S. PATENT DOCUMENTS

| | | | |
|---|---|---|---|
| 5,075,682 A | 12/1991 | Dehnert | |
| 5,077,561 A | 12/1991 | Gorton et al. | |
| 5,117,240 A | 5/1992 | Anderson et al. | |
| 5,119,225 A | 6/1992 | Grant et al. | |
| 5,120,007 A | 6/1992 | Pocha et al. | |
| 5,124,925 A | 6/1992 | Gamble et al. | |
| 5,151,706 A | 9/1992 | Roederer et al. | |
| 5,187,491 A | 2/1993 | Schuss et al. | |
| 5,199,672 A | 4/1993 | King et al. | |
| 5,257,030 A | 10/1993 | Aoki et al. | |
| 5,317,328 A | 5/1994 | Allen | |
| 5,326,054 A | 7/1994 | Turner | |
| 5,398,035 A | 3/1995 | Densmore et al. | |
| 5,422,913 A | 6/1995 | Wilkinson | |
| 5,439,190 A | 8/1995 | Horstein et al. | |
| 5,473,601 A | 12/1995 | Rosen et al. | |
| 5,483,663 A | 1/1996 | Tawil | |
| 5,495,258 A | 2/1996 | Muhlhauser et al. | |
| 5,551,624 A | 9/1996 | Horstein et al. | |
| 5,552,798 A | 9/1996 | Dietrich et al. | |
| 5,553,816 A | 9/1996 | Perrotta | |
| 5,561,837 A | 10/1996 | Muller et al. | |
| 5,584,047 A | 12/1996 | Tuck | |
| 5,619,211 A | 4/1997 | Horkin et al. | |
| 5,625,640 A | 4/1997 | Palmer et al. | |
| 5,641,134 A | 6/1997 | Vatt | |
| 5,652,597 A | 7/1997 | Caille | |
| 5,655,005 A | 8/1997 | Wiedeman et al. | |
| 5,669,585 A | 9/1997 | Castiel et al. | |
| 5,678,175 A * | 10/1997 | Stuart et al. | 455/13.1 |
| 5,736,959 A | 4/1998 | Patterson et al. | |
| 5,738,309 A | 4/1998 | Fowell | |
| 5,761,605 A | 6/1998 | Tawil et al. | |
| 5,765,098 A | 6/1998 | Bella | |
| 5,788,187 A | 8/1998 | Castiel et al. | |
| 5,793,813 A | 8/1998 | Cleave | |
| 5,805,067 A | 9/1998 | Bradley et al. | |
| 5,810,292 A | 9/1998 | Garcia et al. | |
| 5,810,297 A | 9/1998 | Basuthakur et al. | |
| 5,813,633 A | 9/1998 | Anzel | |
| 5,845,206 A | 12/1998 | Castiel et al. | |
| 5,867,783 A | 2/1999 | Horstein et al. | |
| 5,870,439 A | 2/1999 | Ben-Efraim et al. | |
| 5,871,181 A | 2/1999 | Mass | |
| 5,884,866 A | 3/1999 | Steinmeyer et al. | |
| 5,905,474 A | 5/1999 | Ngai et al. | |
| 5,918,157 A | 6/1999 | Wiedeman et al. | |
| 5,930,680 A | 7/1999 | Lusignan | |
| 5,931,417 A | 8/1999 | Castiel | |
| 5,940,739 A | 8/1999 | Conrad et al. | |
| 5,955,783 A | 9/1999 | Ben-Efraim et al. | |
| 5,957,409 A | 9/1999 | Castiel et al. | |
| 5,959,590 A | 9/1999 | Sanford et al. | |
| 5,959,592 A | 9/1999 | Petruzzelli | |
| 5,961,077 A | 10/1999 | Koppel et al. | |
| 5,963,175 A | 10/1999 | Burr | |
| 5,971,324 A | 10/1999 | Williams et al. | |
| 5,979,830 A | 11/1999 | Kellermeier | |
| 5,979,832 A | 11/1999 | Draim | |
| 5,990,883 A | 11/1999 | Byrne et al. | |
| 5,991,279 A | 11/1999 | Haugli | |
| 5,999,797 A * | 12/1999 | Zancho et al. | 455/12.1 |
| 6,007,027 A | 12/1999 | Diekelman et al. | |
| 6,019,318 A | 2/2000 | Cellier et al. | |
| 6,032,902 A | 3/2000 | Palmade et al. | |
| 6,034,634 A | 3/2000 | Karlsson et al. | |
| 6,041,224 A | 3/2000 | Wada | |
| 6,059,233 A | 5/2000 | Koppel et al. | |
| 6,073,011 A | 6/2000 | Horstein | |
| 6,091,931 A | 7/2000 | Ben-Efraim et al. | |
| 6,105,060 A * | 8/2000 | Rothblatt | 709/219 |
| 6,111,542 A | 8/2000 | Day et al. | |
| 6,116,545 A | 9/2000 | Salvatore et al. | |
| 6,122,596 A | 9/2000 | Castiel | |
| 6,126,116 A | 10/2000 | Cellier | |
| 6,134,282 A | 10/2000 | Ben-Efraim et al. | |
| 6,135,389 A | 10/2000 | Fowell | |
| 6,149,103 A | 11/2000 | Salvatore | |
| 6,151,496 A | 11/2000 | Richards et al. | |
| 6,160,993 A * | 12/2000 | Wilson | 455/12.1 |
| 6,172,650 B1 * | 1/2001 | Ogawa et al. | 343/836 |
| 6,175,719 B1 | 1/2001 | Sarraf et al. | |
| 6,198,907 B1 * | 3/2001 | Torkington et al. | 455/12.1 |
| 6,204,822 B1 | 3/2001 | Cardiamenos et al. | |
| 6,204,823 B1 | 3/2001 | Spano et al. | |
| 6,208,834 B1 | 3/2001 | Tawil et al. | |
| RE37,140 E | 4/2001 | Schloemer | |
| 6,219,617 B1 | 4/2001 | Dreischer et al. | |
| 6,223,019 B1 * | 4/2001 | Briskman et al. | 455/12.1 |
| 6,226,493 B1 | 5/2001 | Leopold et al. | |
| 6,229,500 B1 | 5/2001 | Caille et al. | |
| 6,257,526 B1 | 7/2001 | Taormina et al. | |
| 6,259,415 B1 | 7/2001 | Kumpfbeck et al. | |
| 6,263,188 B1 | 7/2001 | Castiel et al. | |
| 6,325,332 B1 | 12/2001 | Cellier et al. | |
| 6,327,523 B2 * | 12/2001 | Cellier | 455/13.1 |
| 6,333,924 B1 * | 12/2001 | Porcelli et al. | 455/13.1 |
| 6,336,612 B1 | 1/2002 | Taormina et al. | |
| 6,339,707 B1 | 1/2002 | Wainfan et al. | |
| 6,353,490 B1 | 3/2002 | Singer et al. | |
| 6,366,256 B1 | 4/2002 | Ramanujam et al. | |
| 6,388,634 B1 | 5/2002 | Ramanujam et al. | |
| 6,389,336 B2 | 5/2002 | Cellier | |
| 6,422,516 B1 * | 7/2002 | Maeda et al. | 455/429 |
| 6,460,808 B2 | 10/2002 | Taormina et al. | |
| 6,501,941 B1 * | 12/2002 | Chang et al. | 455/13.1 |
| 6,515,617 B1 | 2/2003 | Demers et al. | |
| 6,564,053 B1 * | 5/2003 | Briskman et al. | 455/427 |
| 6,675,011 B1 * | 1/2004 | Kita | 455/427 |
| 6,678,519 B2 * | 1/2004 | Castiel et al. | 455/427 |
| 6,684,056 B1 * | 1/2004 | Emmons et al. | 455/12.1 |
| 6,778,810 B1 * | 8/2004 | Anderson | 455/12.1 |
| 6,813,492 B1 | 11/2004 | Hammill et al. | |
| 718,476 A1 | 2/2007 | Wang | |
| 2001/0012759 A1 | 8/2001 | Castiel et al. | |
| 2001/0019942 A1 | 9/2001 | Tawil et al. | |
| 2002/0016157 A1 | 2/2002 | Arsenault et al. | |
| 2002/0025005 A1 | 2/2002 | Onggosanusi et al. | |
| 2002/0032908 A1 | 3/2002 | Booth | |
| 2002/0160710 A1 | 10/2002 | Castiel et al. | |

FOREIGN PATENT DOCUMENTS

| | | |
|---|---|---|
| EP | 0959573 | 11/1999 |
| EP | 1083720 | 3/2001 |
| JP | 10-258799 | 9/1998 |
| WO | WO 95/35602 | 12/1995 |
| WO | WO 98/51022 | 11/1998 |

OTHER PUBLICATIONS

Thiel, A.K.; "Medium Altitude Phased Orbit Satellite Systems"; Conference Proceedings Winter Convention on Military Electronics; Jan. 1, 1965; pp. 17-24; p. 21 - right hand column; p. 22 - left hand column.

Logsdon; "Mobile Communication Satellites"; 1995; XP002132568; pp. 156-157, 208-209 and 223.

Chiba, Isamu; "inclined Geo Satellite Communication System with Deployable Phased Array Antennas"; AIAA-98-1254; pp. 243-249.

Radio Communication Study Groups; Effects of NGSO Provisional EPFD; APFD Limits on 'Quasi-Geostationary' Systems; Jun. 25, 1998; pp. 1-14.

Rizzi, Peter A.; "Microwave Engineering, Passive Circuits"; Prentice Hall; title page and pp. 229-234.

Before the Federal Communications Commission, In the Matter of: Amendment of Parts 2 and 25 of the Commission's Rules to Permit Operation of NGSO FSS Systems Co-Frequency with GSO and Terrestrial Systems in the Ku-Band Frequency Range; Amendment of the Commission's Rules to Authorize Subsidiary Terrestrial Use of the 12.2-12.7 GHz Band by Direct Broadcast Satellite Licenses and their Affiliates; and Applications of Broadwave USA, PDC Broadband Corporation, and Satellite Receivers, Ltd. To Provide a Fixed Service in the 12.2-12.7 GHz Band. Comments of AT&T Corp., Mar. 12, 2001, 24 pp.

Berrou et al.; "Near Shannon Limit Error-Correcting Coding and Decoding: Turbo-Codes (1)"; Proceedings ICC 1993; Geneva, Switzerland; May 1993: pp. 1064-1070.

Chapter 5: Other Non-Geosynchronous Satellite Communications Systems; World's high-tech book series - 10; May 10, 1994; 1st edition; Dempa Publications.

Yamawaki, Koji; "A Study on Global Constellation for Satellite Navigation"; Journal of Japan Society for Aeronautical and Space Sciences; Apr. 5, 1994; vol. 42, No. 483; pp. 232-242 (Japanese with English abstract and partial English translation).

Hult, Joh L.; "Sharing the UHF Between Space and Terrestrial Services"; Sep. 1970; Defense Technical Information Center.

Communication pursuant to Article 96(2) EPC dated Oct. 12, 2007.

US 5,415,368, 05/1995, Horstein et al. (withdrawn)

* cited by examiner

SYSTEM AND METHOD FOR CONTINUOUS BROADCAST SERVICE FROM NON-GEOSTATIONARY ORBITS

CROSS REFERENCE TO RELATED APPLICATIONS

The present application is related to the following applications:

U.S. patent application Ser. No. 10/657,452, filed Sep. 5, 2003, which is a divisional application of Ser. No. 10/230,424, filed Aug. 28, 2002, now U.S. Pat. No. 6,766,987, which is a continuation application of U.S. patent application Ser. No. 10/008,675, filed Oct. 23, 2001, now U.S. Pat. No. 6,460,808, which is a continuation application of U.S. patent application Ser. No. 09/783,862, filed Feb. 13, 2001, now U.S. Pat. No. 6,336,612, which is a divisional application of U.S. patent application Ser. No. 09/188,440, filed Nov. 9, 1998, now U.S. Pat. No. 6,257,526;

U.S. patent application Ser. No. 11/653,516, filed Jan. 16, 2007, which is a continuation application of Ser. No. 09/536,275, filed Mar. 27, 2000, now U.S. Pat. No. 7,184,761; and U.S. patent application Ser. No. 11/827,259, filed Jul. 11, 2007, which is a continuation application of Ser. No. 10/872,810, filed Jun. 21, 2004, now U.S. Pat. No. 7,257,370, which is a continuation application of U.S. patent application Ser. No. 09/480,089, filed Jan. 10, 2000, now U.S. Pat. No. 6,778,810.

BACKGROUND OF THE INVENTION

1. Field of the Invention

The present invention relates to systems and methods for providing satellite broadcast services, and in particular to a low cost system for increasing channel capacity in a satellite broadcast network.

2. Description of the Related Art

The past decade has seen the development of Direct Broadcast Satellite (DBS) services for providing video, audio, data, and other program material to subscribers. The electromagnetic spectrum allocated for DBS in the United States has been limited to 500 MHz. This constraint limits the maximum number of channels that existing DBS service can offer from one geostationary orbit (GSO) slot, since each video channel typically occupies about 2-6 MHz of bandwidth, depending on the data rates. This shortage of spectrum/channels becomes worse with the emerging demand for High Definition TV (HDTV) which requires much higher bandwidth per channel than traditional video channels. The shortage of spectrum and channels is made even more apparent with the recent approval for DBS operators to provide local programming. Three are an estimated 200 or more local TV stations spreading over the domestic markets, and DBS operators will not be able to cover all cities through their existing fleet of satellites, if the demand on extending channel numbers continue to grow.

One possible solution is to use another GSO orbital slot for DBS services. However, using another GSO slot is not a permanent solution, because the 9 degree orbit slot spacing requirement for satellites broadcasting at DBS frequencies allow only few slots for giving service regions (e.g. the continental United States, or CONUS) and these orbital slots are almost all taken.

Another possible solution is to use different or additional frequency bands to transmit the additional information. Unfortunately, this solution requires that each subscriber's receiver include additional circuitry to detect and demodulate the information on the additional frequency bands. Further, this solution faces the formidable task of overcoming the regulatory process to acquire the required spectrum.

What is needed is a system and method for providing high bandwidth DBS services that augment current DBS systems in a non-interfering way. The present invention satisfies that need.

SUMMARY OF THE INVENTION

To address the requirements described above, the present invention discloses a method and apparatus for providing at least near continuous broadcast services to one or more terrestrial receiver stations. The system comprises a plurality of satellites, each satellite in an inclined, elliptical geosynchronous orbit, each satellite providing a portion of the at least near continuous broadcast service to the terrestrial receiver. In one embodiment, the system also comprises a receiver station having a legacy antenna modified so as to include a sensitivity pattern substantially matched to the track of the apparent position of the satellites actively broadcasting information to the receiver stations. The present invention is also embodied in a method for receiving at least near continuous broadcast service from at least one of a plurality of satellites at a time, each satellite in an inclined, elliptical, geosynchronous orbit.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part thereof, and which is shown, by way of illustration, several embodiments of the present invention. It is understood that other embodiments may be utilized and structural changes may be made without departing from the scope of the present invention.

Video Distribution System

Figure 1:
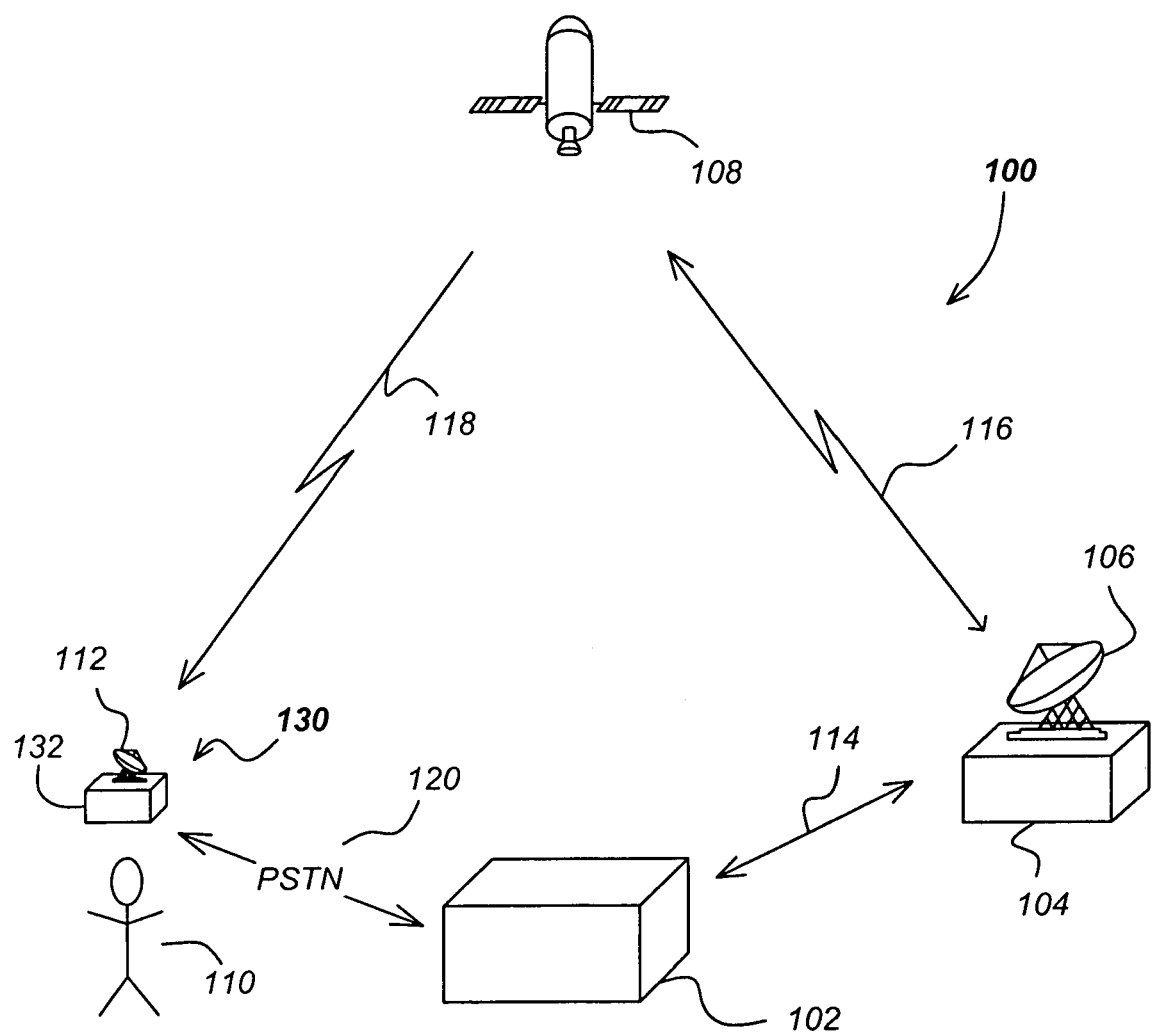
FIG. 1 is a diagram illustrating an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at terrestrial receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to a geostationary satellite 108. The satellite 108 receives and processes this information, and transmits the video programs and control information to the IRD 132 and a communicatively coupled receiver station antenna 112 at the receiver station 130 via downlink 118. The IRD 132 receives this information using a communicatively coupled subscriber antenna 112.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

The foregoing video distribution system 100 provides continuous broadcast services using geostationary satellites 108. Since the apparent position of the satellites in the sky does not move, inexpensive stationary ground antennae can be used to receive the broadcast signal. However, as described above, the number of channels available in such a system is limited by the allocation of broadcast bandwidth and the number of geostationary satellite orbital slots. The present invention provides the additional broadcast bandwidth with a satellite constellation that is compatible with existing DBS broadcast systems.

There are typically three configurations that allow a terrestrial receiver station 130, whether mobile or stationary, to communicate with satellites 108. First, the receiver station 130 may point in a fixed direction at a geostationary satellite (e.g legacy satellite 204), whose apparent position in the sky remains stationary over time. Second, the receiver station 130 may be equipped with antennae 112 and other equipment that allows tracking a non-geostationary satellite (such as a low earth orbit or mid earth orbit satellite) as the apparent position of the satellite moves in the sky over time. Third, the receiver station 130 may have an omni-directional antenna. Unfortunately, all of these configurations have drawbacks. The drawback of the first configuration is that they are generally usable only with geostationary satellites, and orbital slots for geostationary satellites are a precious commodity. One drawback of the second configuration is that it requires expensive receiver station 130 equipment. One drawback of the second configuration is that it is difficult to use for two way communications between the receiver station 130 and the satellite 108, and the low gains inherent with omnidirectional antennae place greater demands on the receiver and transmitter subsystems of the satellite 108 and the IRD 132.

Enhanced Video Distribution System

Figure 2:
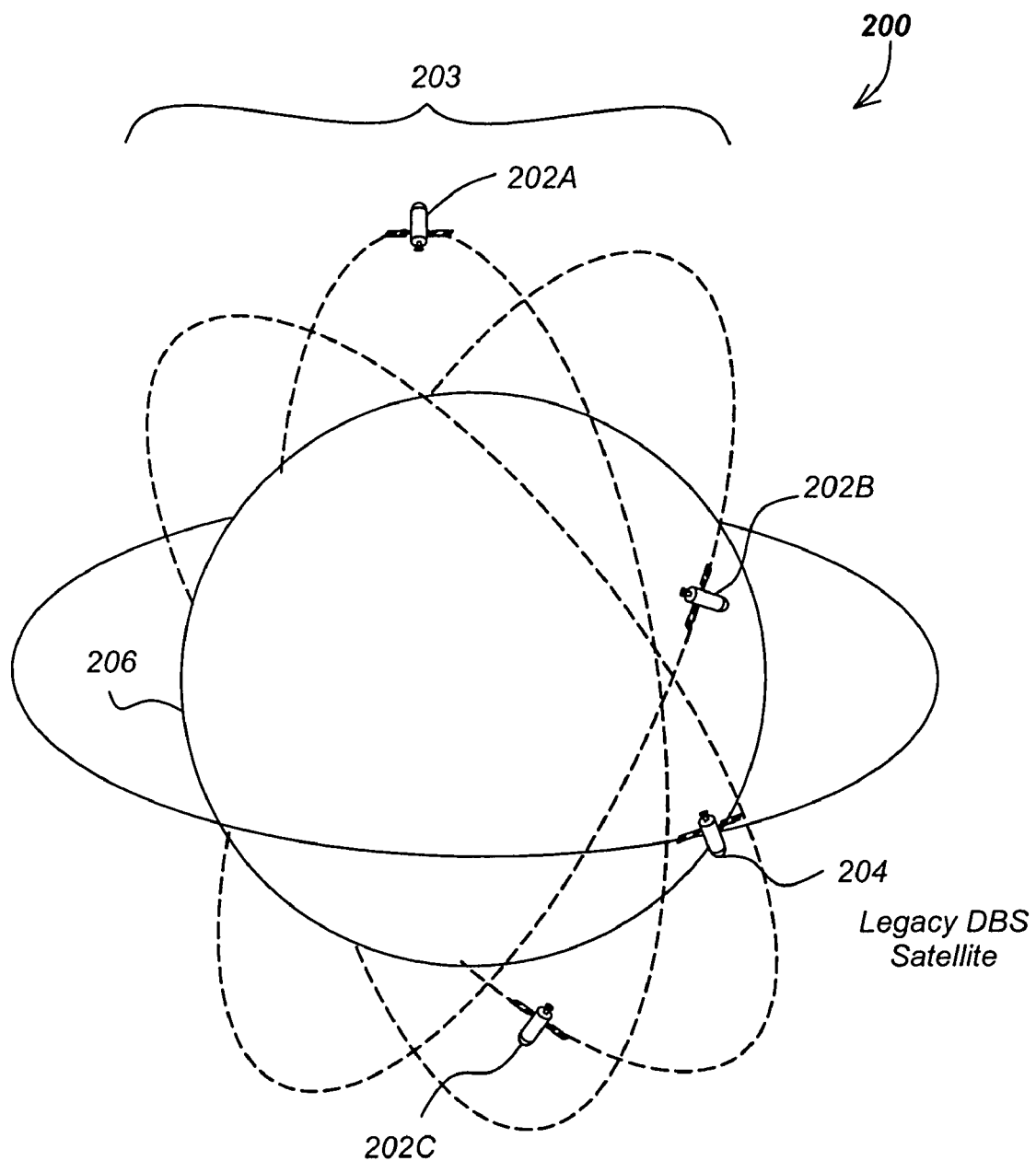
FIG. 2 is a diagram showing one embodiment of a satellite constellation of an enhanced video distribution system using the principles of the present invention.

FIG. 2 is a diagram showing one embodiment of a satellite constellation of an enhanced video distribution system 200 using the principles of the present invention. The enhanced video distribution system comprises one or more legacy satellites 108 in a geostationary orbit around the Earth 206, and an augmenting satellite constellation 203 of three or more satellites 202A-202C (hereinafter alternatively referred to as satellite(s) 202) which are in inclined, substantially elliptical, geo-synchronous orbits with objective service at or near the center of CONUS. Each satellite 202 provides an active period of about 8 hours of broadcast service per day. The constellation 203 is phased so that when an active satellite 202 (which is currently providing the broadcast service) is no longer able to do so, the broadcast service function is handed over to the next satellite 202 entering the region over the service area. Since there is always at least one active satellite 202 available, continuous, 24 hours a day coverage is provided. In one embodiment, the orbital parameters for the augmenting satellite constellation 203 are as shown in Table I below:

TABLE I

| Longitude | 97 degrees West |
| --- | --- |
| Period | 86164.09 Seconds |
| Inclination | 50 degrees |
| Eccentricity | 0.13 |
| Altitude at Perigee | 30305 Km |
| Altitude at Apogee | 41268 Km |
| Phase difference between adjacent orbital planes | 120 degrees |

Figure 3:
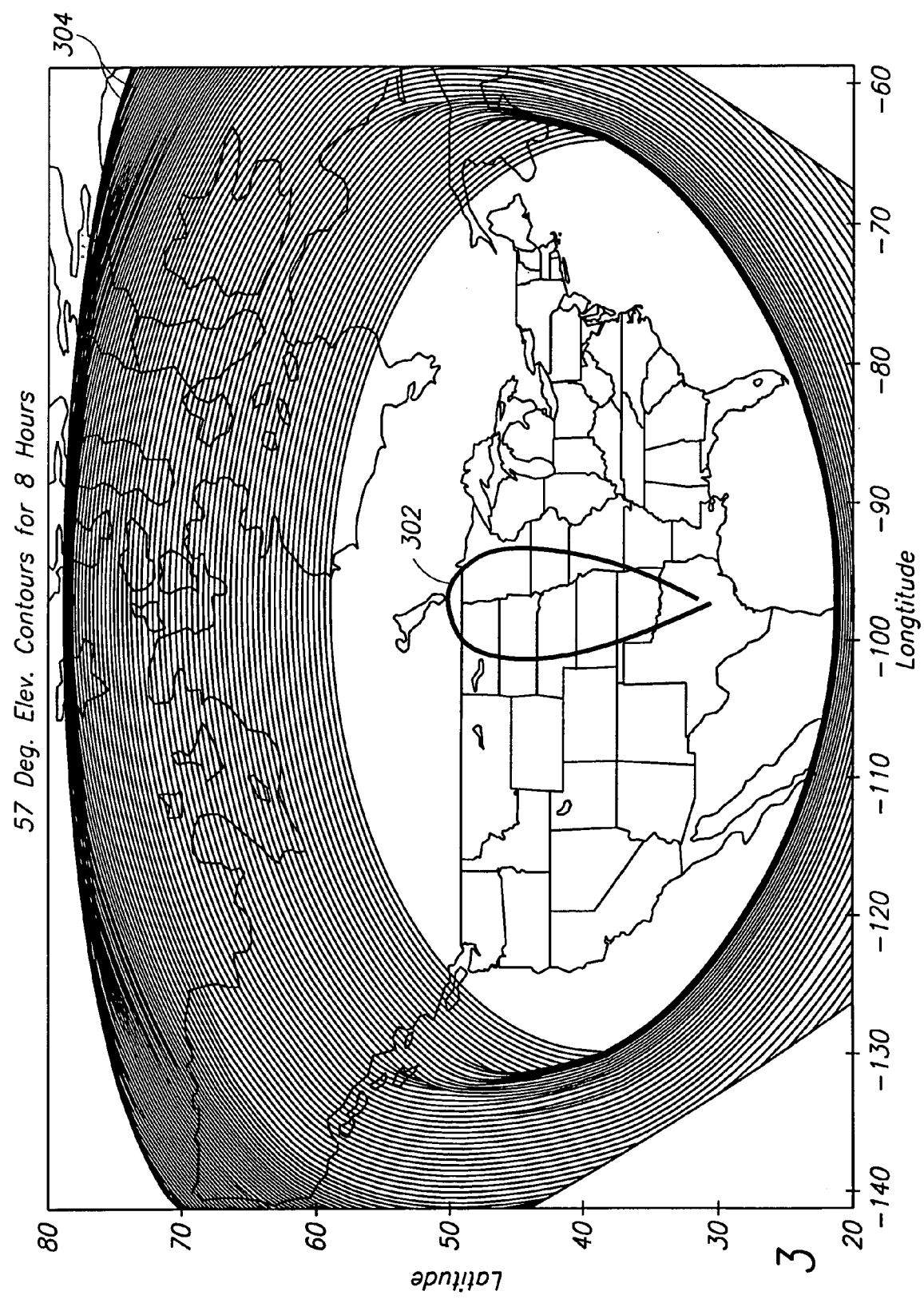
FIG. 3 is a diagram illustrating the ground track of the orbit of a satellite in the augmenting satellite constellation.

FIG. 3 is a diagram illustrating the ground track 302 of the orbit of the satellite 202 specified in Table I, centered at the geographical center of CONUS for an 8-hour period when the satellite is providing broadcast services to a subscriber. The outside rings 304 show 57 degree elevation contours at 10 minute intervals within the active period. Note that all of CONUS (all 48 states) are covered within the 57 degree elevation angle. The ground track 302 of the orbit of the satellite 202 is a closed loop in a (reversed) teardrop shape. This eliminates sudden shifts in the apparent position of the active satellite (as the task of transmitting the broadcast signal is shifted from a first satellite (e.g. 202A) to a second satellite (e.g. 202B) in the constellation) and thus allows an IRD 132 with a fixed (non tracking) receiver station antenna 112 to receive uninterrupted service from the satellite constellation.

The enhanced video distribution system 200 of the present invention has several advantages over the systems described above. The receiver station 132 maintains relatively high gain and a fixed antenna configuration, yet is still capable of communicating with non-GSO satellites. The augmenting constellation 203 is designed to minimize the apparent motion of the constellation 203 member satellites 202 in the sky so that so that the sensitivity pattern of a stationary receiver station antenna 112 is sufficient to receive the broadcast signal from at least one of the augmenting constellation 203 satellite 202 members at any given time.

The augmenting satellite constellation 203 of the video distribution system 100 provides not only an optimized coverage for receiver stations 130 within CONUS but also minimizes the footprint of the apparent satellite position over time. This allows the use of receiver station antennae 112 which offer relatively high gain and low beamwidth. Further, the augmenting satellite constellation 203 presents apparent satellite positions that are sufficiently disposed away from the apparent positions of GSO satellites. This allows the video distribution system 100 to operate with existing GSO distribution systems without interference. Finally, as will be discussed later, the teardrop shape of the apparent position of the active satellite 202 over time during the active period substantially coincides with a teardrop sensitivity pattern of the receiver station antennae.

Figure 4:
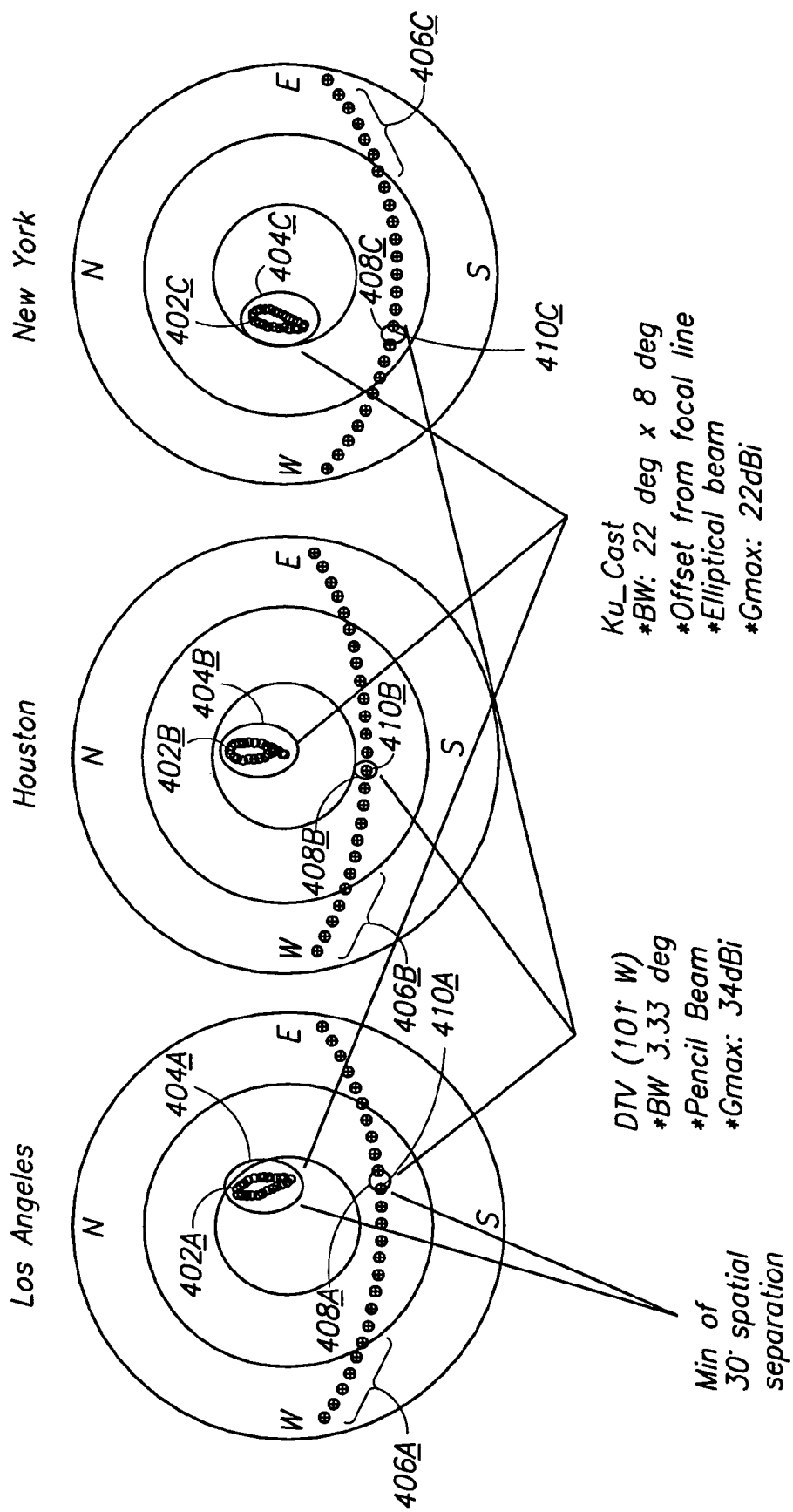
FIG. 4 is a diagram presenting a polar fish-eye view of the apparent position of the augmented satellite constellation over an 8-hour period.

FIG. 4 is a diagram presenting polar fish-eye views of the apparent position of the satellite 202 members of the augmenting satellite constellation 203 over an 8-hour period, for three representative cites within CONUS (Los Angeles, Houston, and New York). As is shown, the shape of the track of the apparent position of the satellite 402A-402C (hereinafter alternatively referred to as satellite tracks 402) in the sky over time is consistently teardrop shaped. Further, the satellite tracks 402 exhibit a wide spatial separation away from the apparent position of the satellite 202 apparent position of existing GSO satellites. In particular, FIG. 4 shows that the minimum angular separation satellite tracks 402 and a representative DBS satellite in a GEO orbit (101 degrees West) at least thirty degrees. This design achieves a balance between the requirements of high elevation angle and simplicity of antenna pointing.

FIG. 4 also shows the sensitivity pattern (essentially, the beamwidth) for the receiver station antenna 112 for existing DBS services 408A-408C. Since the geostationary satellites of the existing DBS service are effectively motionless in the sky, the beamwidth 408A-408C (hereinafter alternatively referred to as beamwidth 408) of the receiver station antennae 112 used to receive signals from the legacy satellite(s) 204 is only approximately 3.33 degrees, and the gain of the receiving station antenna is approximately 34 dBi. The satellites 202 of the augmenting satellite constellation 203, however do not retain a fixed apparent position in the sky, but rather move about. Consequently, the beamwidth 404A-404C (hereinafter referred to as beamwidth 404) of the receiver station antennae 112 used to receive signals from the satellites 202 in the augmenting constellation 203 is wider. In one embodiment, the beamwidth approximately 22 degrees by 8 degrees, and can be elliptically or teardrop shaped. Since the receiver station antennae 112 is used to cover a greater portion of the sky, the gain of the antenna is lower than that which is used to receive signals from the legacy satellites. In one embodiment, the gain is approximately 22 dBi. Hence, the overall gain of the receiver station antennae 112 is nominally about 12 dB less than standard DBS receiver station antennae. This lower gain can be accommodated by using multiple spot beams from the satellites 204, by increasing transmitter power, by increasing the size of the reflector of the antenna at the receiver station, or by similar methods.

Tracking Antennae for Gateway or High Data Rate Receiver Station Applications While the augmenting constellation 203 of the present invention obviates the need for the use of receiver station antennae 112 that can track a satellite 108 across the sky, the ability of the receiver antenna 112 to track a satellite across the sky can still be valuable for some applications. For example, in typical broadcast applications, the size of the receiver station antenna 112 is kept small to ease installation difficulties. This negatively affects the gain of the receiver station antenna 112, and the power of the signal transmitted from the satellite 108 is adjusted to take this into account. However, where two way communications between the receiver station 130 (essentially rendering it a receiver/transmitter station or gateway) and the satellite are desired (e.g. for high-bandwidth Internet and data transfer applications), the smaller size of the receiver station antenna 112 can be problematic, because it negatively affects the strength of the signal transmitted from the receiver station 130. In such situations, it may be advantageous for the antenna at the gateway to track satellites 108 across the sky during service.

The augmenting satellite constellation 203 is designed so that when an active satellite 202 is about to finish its service, its apparent position in the sky relative to the receiver station 130 substantially overlaps with another satellite 202 in the constellation 203 rising and about to enter active service. This allows the receiver station antenna 112 to continue ground tracking without re-steering or experiencing temporary data drop-outs, thus saving the time for tracking and handover.

Figure 5:
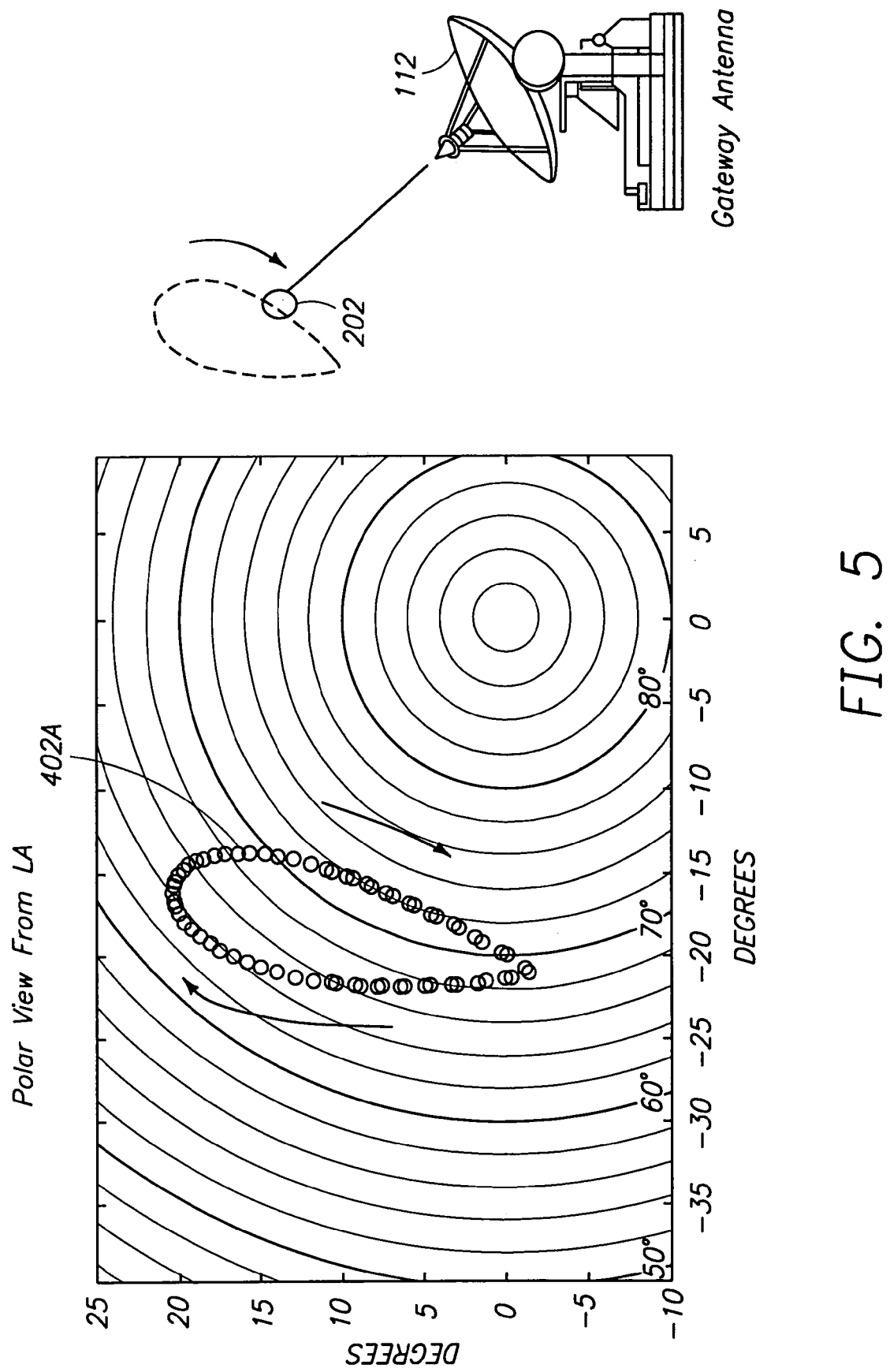
FIG. 5 is a diagram presenting a polar view of the satellite track from a location in CONUS.

FIG. 5 is a diagram presenting a polar view of the satellite track 402A from a location in CONUS (e.g. Los Angeles). The receiver station antenna at the gateway 112G tracks the active satellite 202 during service, following an essentially teardrop path in a clockwise direction. When the active satellite 202 is about to complete service, the next satellite 202 in the constellation 203 is at or near the same apparent position along the satellite track 402A. Small discrepancies between the apparent location of the active satellite 202 and the rising satellite 202 are not problematic, so long as the beamwidth of the gateway antenna 112G is sufficient to encompass both the active satellite 202 and the rising satellite 202 at the same time. The high predictability of the satellite track 402 also allows for simplified gateway antenna 112G design, and the ability to predict where the rising satellite 202 should appear when handoff is necessary.

An important feature of the constellation 203 of the present invention is that it creates satellite tracks 402 that are essentially closed-loop. For a specific orbital period (and hence, service period for each satellite 202) there is only one constellation 203 that can be defined. The constellation 203 described above not only offers the closed loop satellite track 402 feature that simplifies receiver antenna 112 design, it also meets the required elevation angle for servicing subscribers 110 in CONUS and maintains an adequate separation angle from satellites in geostationary orbits.

Dual Capability Receiver Station

One significant advantage of the present invention is that it can be applied to existing receiver station 130 designs.

This allows service capacity to be essentially doubled with minor modifications of existing hardware to add an additional receiving head or LNB and providing an intelligent switch.

Figure 6:
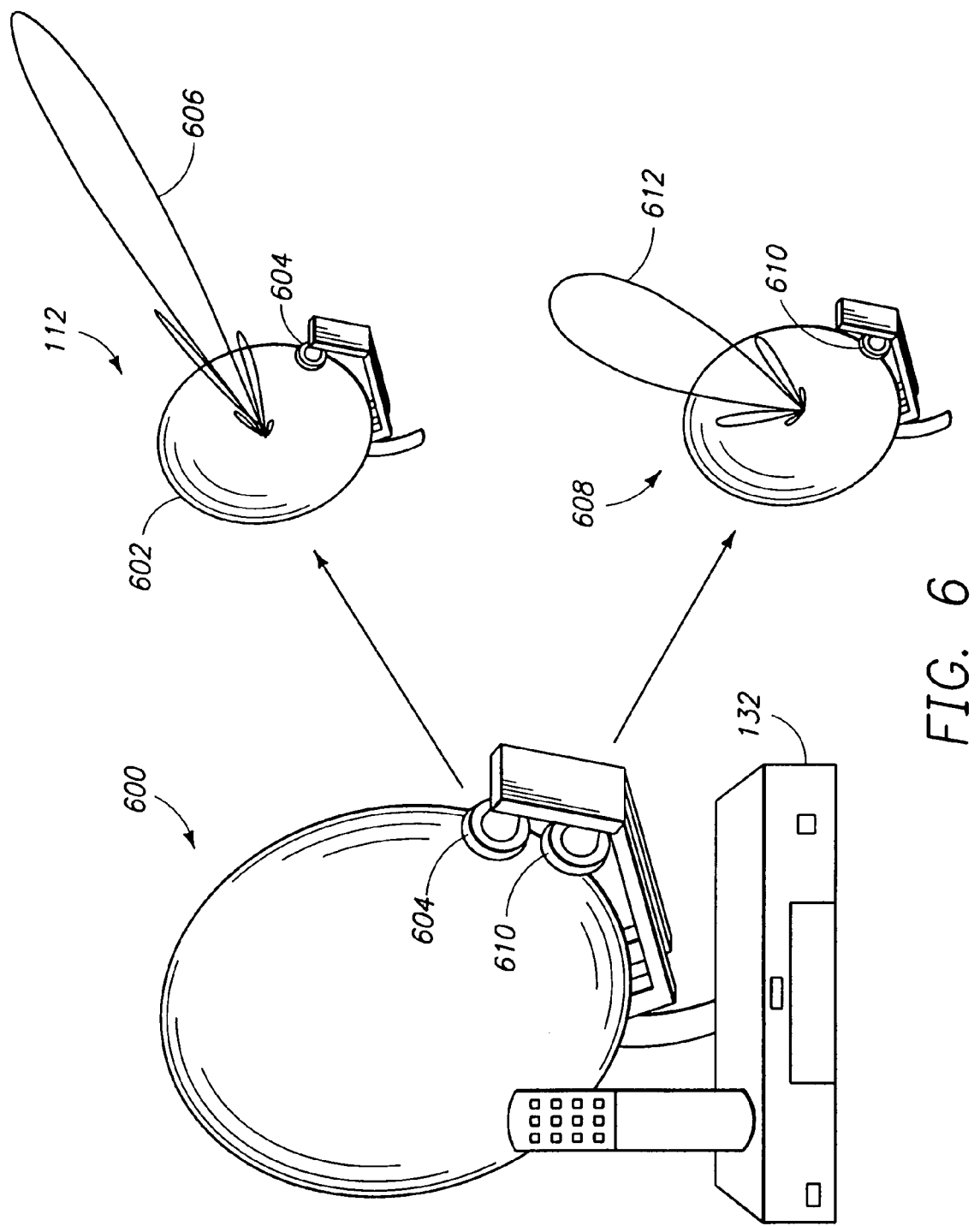
FIG. 6 is a diagram showing an augmented receiver station design.

FIG. 6 is a diagram showing an augmented receiver station 600 design. A baseline receiver station antenna 112 comprises a reflector 602 which is nominally about 45 cm in diameter and a first LNB 604 powered by the IRD 132 via a cable connection. This configuration results in an baseline antenna sensitivity pattern 606. This configuration results in an approximate gain of 34 dBi, and is used to communicate with the satellites in geostationary orbit (GSO satellites). The augmented receiver station antenna 608 further comprises a second LNB 610 offset from the first LNB 604, resulting in a second antenna sensitivity pattern 612 which is non-symmetric and covers the movement of the satellites in the augmenting satellite constellation 203 when each of the augmenting satellites 202 are in the active period. This configuration has an approximate gain of 22 dBi, and is used to communicate with the (NGSO) satellites in the augmenting satellite constellation 203. Signals are received via the first LNB 604 and second LNB 610 according to a switch controlled by the IRD 132.

The reduced gain inherent in the augmented receiver station (22 dBi versus 34 dBi) may be compensated for by increasing the output of the signal from the satellites in the augmenting constellation.

The foregoing can be implemented with a simple clip on LNB head, or a minor replacement to legacy LNBs. To maximize performance, the location of the second LNB 610 can be varied according to geographical location of the subscriber 110.

Figure 7B:
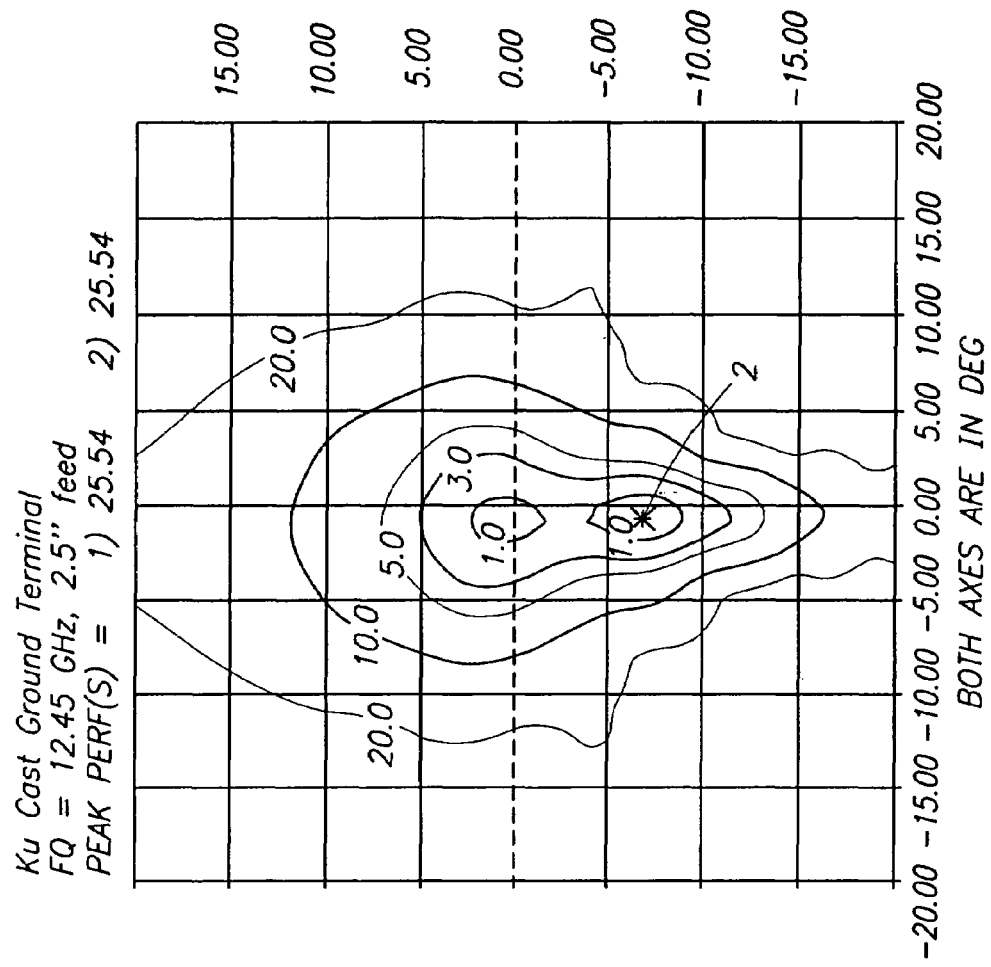
FIG. 7B is a plot of a teardrop-shaped sensitivity pattern of the antenna depicted in FIG. 7A.
Figure 7A:
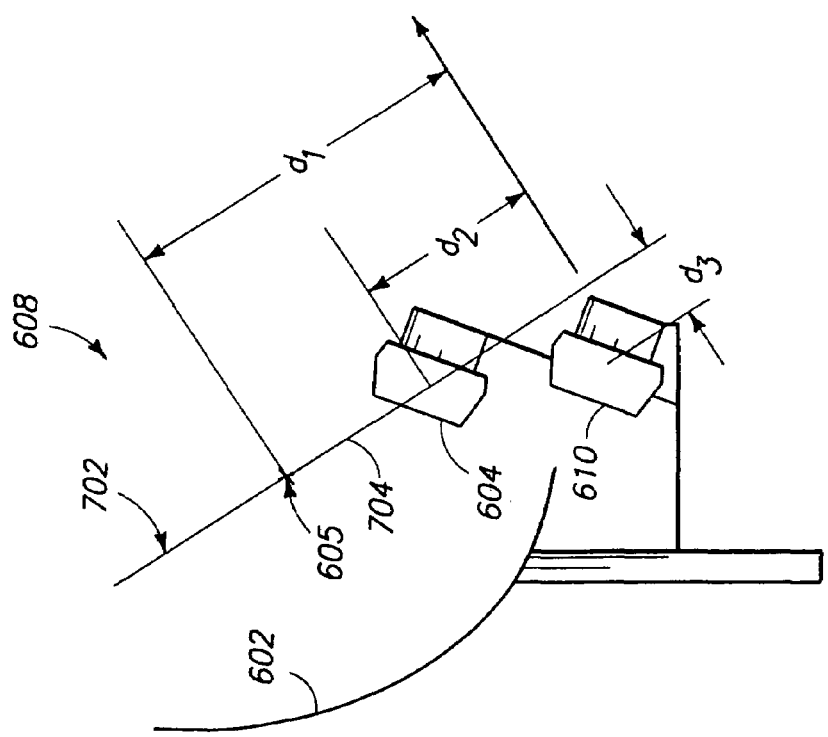
FIG. 7A is a cross sectional diagram of an augmented receiver station antenna.

FIG. 7A is a cross sectional diagram of an augmented receiver station antenna 608. The reflector 602 of the antenna 608 can be characterized by a focal plane 702, representing the locus of points at the focus of the parabolic reflector 602. A vertically oriented focal line 704 and a focal point 605 at the along the centerline 603 of the parabolic reflector 602 can be defined on the focal plane 702. In the embodiment illustrated in FIG. 7A, the second LNB 610 is offset a first distance $d_1$ from the focal point 605 of the parabolic reflector, offset a first distance $d_2$ from the location of the first LNB 606 along the focal line 704 and offset a distance $d_3$ perpendicularly away from the focal line 704. In one embodiment, $d_1$ is approximately seven inches, and $d_3$ is approximately four inches. This design generates the reverse teardrop-shaped sensitivity pattern shown in FIG. 7B, and covers the movement of the active satellite 202 in the augmenting satellite constellation 203. Hence, by matching the sensitivity pattern of the antenna 608 with the apparent motion of the active satellite 202, a receiver station can be constructed that does not require active tracking of the satellite. While the foregoing shows an implementation using two separate LNBs, the present invention may be practiced using a single integrated LNB.

In addition to facilitating the design of a simplified receiver station, the augmenting satellite constellation 203 also achieves the highest elevation for coverage focusing at CONUS. Impact of the apparent motion of the satellites 202 is now discussed.

Figure 8:
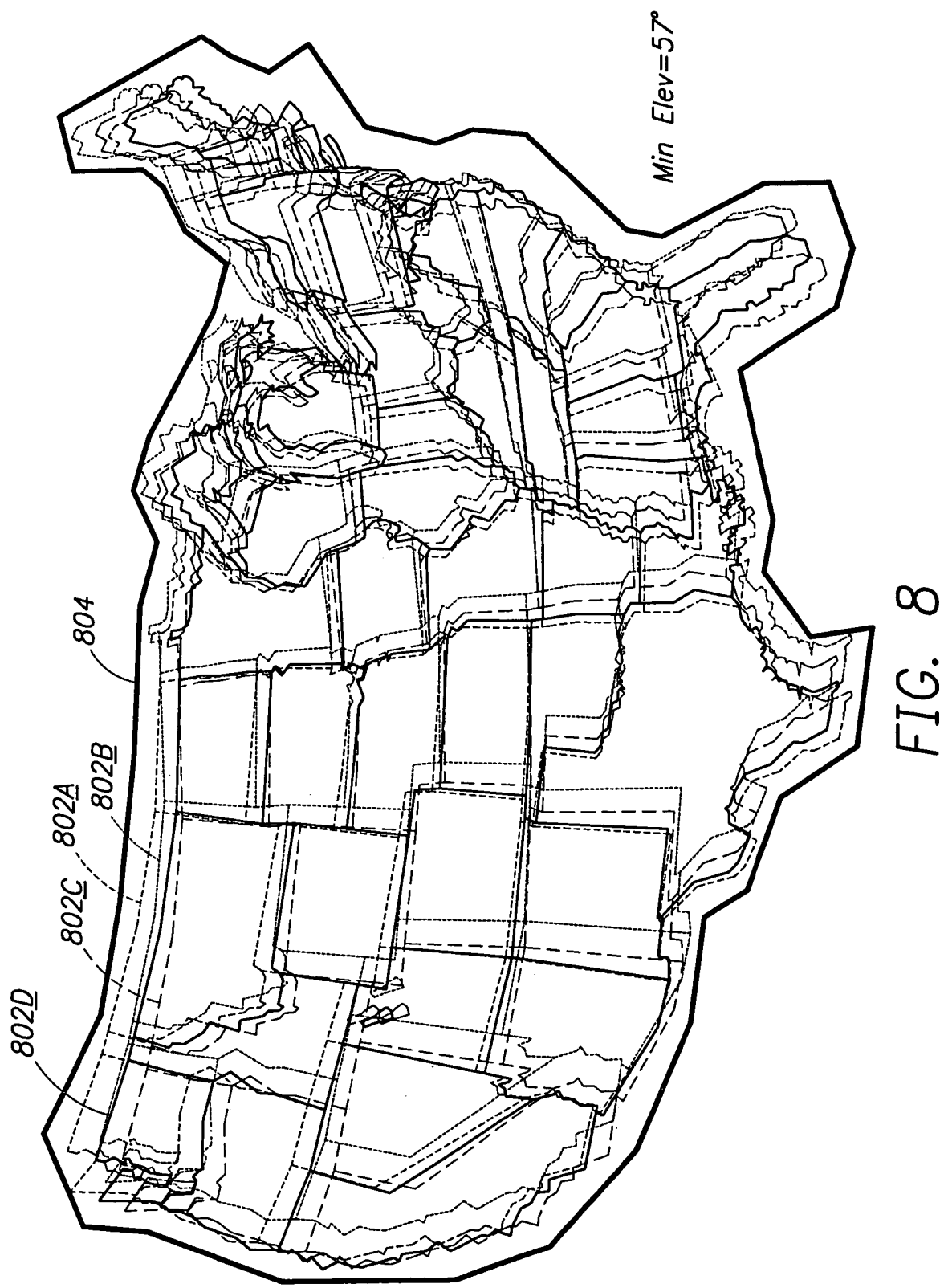
FIG. 8 is a plot of CONUS contours seen from an active satellite at boundary points in the satellite's apparent position within the active period.

FIG. 8 is a plot of four CONUS contours 802A-802D as seen from the active satellite 202 at four boundary points in the satellite's apparent position within the 8-hour active period. If the satellite 202 can steer its beam to minimize the gain degradation due to movement, then the shapes of CONUS, after new steering by aiming to the center of the desired coverage area, will be covered through a general shape marked by the outside contour 804. Any point at the CONUS within this 8-hour active period, the receiving station can see at least one satellite 202 at a minimum elevation of 57°. Since these satellites 202 are in a non-circular orbits (nominal eccentricity of 0.13) the satellites also change altitude during the active period, but this change of altitude does not cause major contours. Hence, the design of spacecraft 202 antenna is similar to that of legacy satellite 204.

Figure 9:
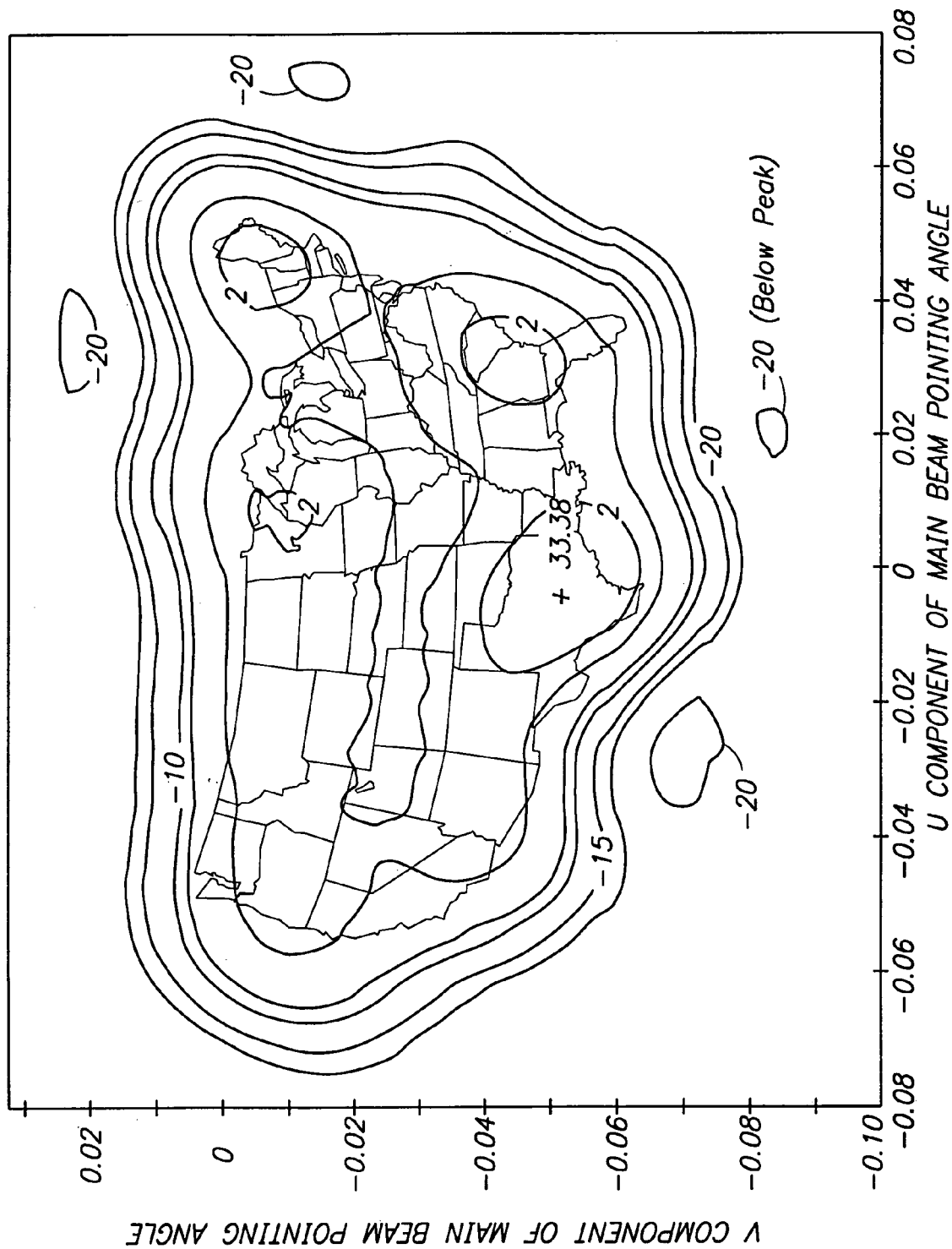
FIG. 9 illustrates a sample satellite transmission beam shaped to follow the outer contour of CONUS.

FIG. 9 illustrates sample satellite transmission beam shaped to follow the outer contour 804 shown in FIG. 8. Spot beams (which can offer local programs to regional areas) may also be utilized.

As can be seen, the present invention can be implemented while minimizing changes to existing user equipment through add-on receiver station 130 components, and the augmenting satellite constellation 203. The system requires only two additional hardware components to double the reception capacity provided to the receiver station 130: an add-on kit for the receiving antenna 112, and an intelligent switch to select the signal received from the legacy satellites 104 by the first LNB 606 from the augmenting satellites 202 by the second LNB 610. The intelligent switch may be integrated with other antenna components or with the IRD 132.

As described above, an important advantage of the present invention is that it allows the, antennae, converters, and set top boxes used by current GSO satellites to be used for additional capacity without interference. In addition to these advantages, the present invention allows the augmenting satellite constellation 203 to share the electromagnetic spectrum with the legacy satellites 204. The satellites 202 in the augmenting satellite constellation 203 achieve a minimum 30° spatial separation to avoid the signals from the legacy satellites 204. When a member satellite 202 of the augmenting satellite constellation 203 flies through lower latitude regions during the non-active period, the satellite ceases the transmission of signals in the shard spectrum to avoid harmful interference with legacy satellite 204 transmission. The satellite 202 remains in a stand-by mode until it leaves the lower latitude regions and becomes active. The spatial separation away from legacy satellites 204 (at least 30°) provides large (−30 dB) antenna discrimination, which prevents interference.

The present invention can be used to provide additional bandwidth to nearly any broadcast service provided by satellites in geostationary orbits. The augmenting satellite constellation 203 provides improved capacity, improved reception (due to the higher elevation), and reduced cost (since management and other ground functions can be shared with other GSO systems).

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for providing at least near continuous broadcast service to a terrestrial receiver, comprising:
    a plurality of satellites, each satellite in an inclined, elliptical, geosynchronous orbit, each satellite providing a portion of time of the at least near continuous broadcast service to the terrestrial receiver, wherein the orbit is characterized by an orbital inclination approximately equal to 50 degrees and an eccentricity approximately equal to 0.13;
    wherein the orbit is further characterized by a period approximately equal to 86164 seconds, an altitude at perigee approximately equal to 30305 kilometers, and an altitude at apogee approximately equal to 41268 kilometers.

2. The system of claim 1, wherein the plurality of satellites augments at least one legacy satellite in a geostationary orbit.

3. A method of providing at least near continuous broadcast service to a terrestrial receiver, comprising the steps of:
    providing a signal having a portion of the continuous broadcast service from at least one of a plurality of satellites at a time, each satellite in an inclined, elliptical, geosynchronous orbit, wherein the orbit is characterized by an orbital inclination approximately equal to 50 degrees and an eccentricity approximately equal to 0.13;
    wherein the orbit is further characterized by a period approximately equal to 86164 seconds, an altitude at perigee equal to approximately 30305 kilometers, and an altitude at apogee approximately equal to 41268 kilometers.

4. The method of claim 3, wherein the plurality of satellites augments at least one legacy satellite in a geostationary orbit.

5. A method of receiving at least near continuous broadcast service at a terrestrial receiver, comprising the steps of:
    receiving a signal having a portion of the continuous broadcast service from at least one of a plurality of satellites at a time, each satellite in an inclined, elliptical, geosynchronous orbit, wherein the orbit is characterized by an orbital inclination equal to 50 degrees and an eccentricity equal to 0.13;
    wherein the orbit is further characterized by a period equal to 86164 seconds, an altitude at perigee equal to 30305 kilometers, and an altitude at apogee equal to 41268 kilometers.

6. The method of claim 5, wherein the plurality of satellites augments at least one legacy satellite in a geostationary orbit.

7. A satellite system comprising:
    at least one satellite in a geostationary orbit;
    a plurality of satellites, each in an inclined, elliptical geosynchronous orbit;
    a receiver station antenna that can communicate with said at least one satellite and at least one of said plurality of satellites during an active period without tracking, and
    a gateway having a tracking antenna to track said plurality of satellites;
    wherein each satellite of the plurality of satellites is an active satellite during an active period and a track of the apparent position of each active satellite relative to the receiver station antenna is substantially closed loop and when an active satellite is nearing the end of the active period, the apparent position of the active satellite substantially overlaps another one of the plurality of satellites that is beginning the active period.

8. The satellite system of claim 7, wherein a beamwidth of said tracking antenna of said gateway is sufficient to encompass both said active one and said another one of said plurality of satellites.

9. The satellite system of claim 7, wherein apparent positions of the plurality of satellites are spatially separated from the apparent position of the at least one satellite in geostationary orbit to avoid interference.

10. The satellite system of claim 9, wherein the angular separation between the plurality of satellites and at least one satellite in geostationary orbit is at least thirty degrees.

11. The satellite system of claim 7, wherein the plurality of satellites augments at least one legacy satellite in a geostationary orbit.

* * * * *